H. C. WOGLOM.
COLLET CHUCK.
APPLICATION FILED AUG. 22, 1917.

1,302,619.

Patented May 6, 1919.
2 SHEETS—SHEET 1.

INVENTOR
Howard C. Woglom
BY S. Jay Teller
ATTORNEY

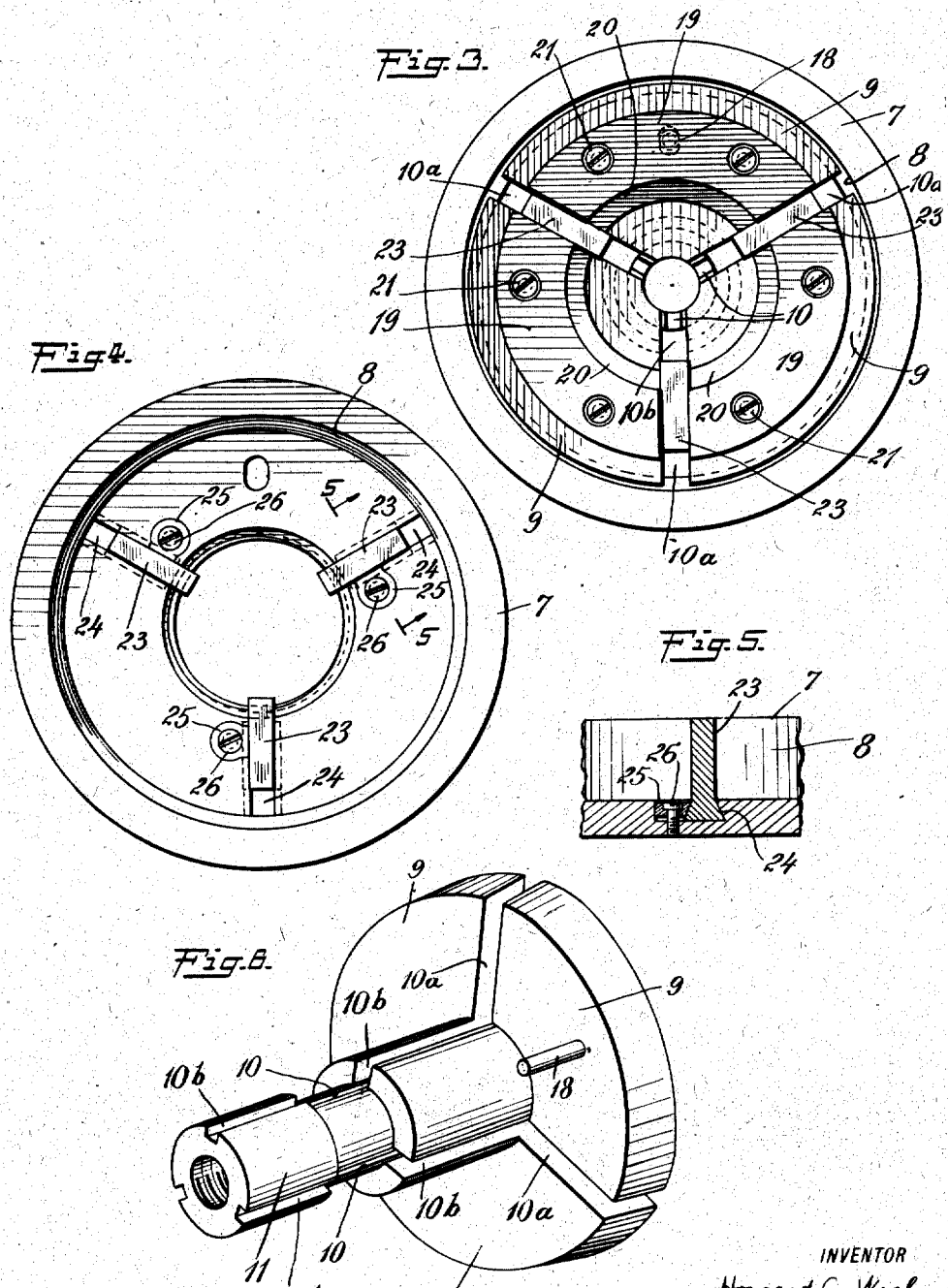

UNITED STATES PATENT OFFICE.

HOWARD C. WOGLOM, OF HARTFORD, CONNECTICUT, ASSIGNOR TO PRATT & WHITNEY COMPANY, OF NEW YORK, N. Y., A CORPORATION OF NEW JERSEY.

COLLET-CHUCK.

1,302,619.  Specification of Letters Patent.  Patented May 6, 1919.

Application filed August 22, 1917. Serial No. 187,576.

*To all whom it may concern:*

Be it known that I, HOWARD C. WOGLOM, a citizen of the United States, residing at Hartford, in the county of Hartford and State of Connecticut, have invented certain new and useful Improvements in Collet-Chucks, of which the following is a specification.

The invention relates particularly to a collet chuck mechanism of the draw-back step type. A chuck of this type has a plurality of jaws which are in engagement with an annular beveled surface of the main chuck body so that when the jaws are drawn backward into the body they are forced toward each other to grip the work. The jaws are formed or provided with an annular shoulder or ledge which corresponds to the diameter of the work blank to be turned, and suitable means are provided for engaging each blank to determine the longitudinal position thereof.

In chucks of this type, as ordinarily constructed heretofore, dependence has been placed upon the shoulders formed on the movable jaws for positioning the work blank longitudinally. It is to be borne in mind, however, that these jaws are movable longitudinally and are so movable to different extents in accordance with variations in the diameters of the work blanks or in accordance with the amount of force applied. For this reason in chucks as heretofore constructed the longitudinal positioning of the work blanks was very inaccurately done, with the result that when the pieces were faced the thickness varied considerably in accordance with variations in the external diameter or variations in the degree of tightening of the chuck.

The principal object of this invention is to provide a chuck of the type described, wherein are provided improved means supplemental to or independent of the chuck jaws for accurately determining the longitudinal position of the blanks. Other objects of the invention will be apparent from the following specification and claims.

In the accompanying drawings, I have shown the embodiment of the invention which I now prefer, and, in order that the invention may be clearly understood, I have shown a chuck in conjunction with a lathe spindle and suitable operating parts. It will be understood, however, that various changes and substitutions of equivalents may be made as concerns the construction of the chuck, and it will be further understood that, as concerns the others parts shown, there can be wide variation as these of themselves constitute no part of the present invention.

Of the drawings:

Fig. 3 is an end view of the chuck.

Fig. 4 is an end view of the chuck body with the jaws removed.

Fig. 5 is a detailed sectional view taken along the line 5—5 of Fig. 4.

Fig. 6 is a perspective view of the chuck jaws.

Figure 1:
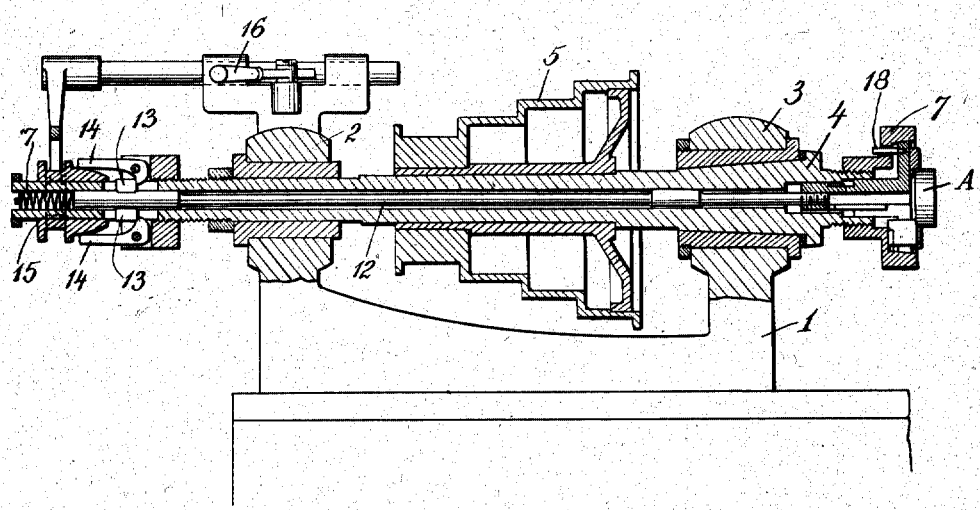
Figure 1 is a vertical longitudinal sectional view showing a lathe head and a collet chuck embodying the invention.

Referring to the drawings, 1 represents the headstock casting of a lathe or shaving machine, this casting being provided with two bearings 2 and 3 in which is mounted a rotatable hollow spindle 4. Suitable means are provided for driving the spindle, such, for instance, as the set of cone belt pulleys 5.

Carried by the hollow spindle at its forward end and preferably held in place by means of the threads 6, is an annular chuck body 7. The chuck body has an internal annular beveled surface 8 which decreases in diameter toward the rear.

Positioned within the chuck body 7 are chuck jaws, which, so far as certain features of the invention are concerned, may be of any one of several constructions. I prefer, however, to provide jaws of the spring type in which all of the jaws are formed from a single piece of metal as shown in perspective in Fig. 6. There can be variation as concerns the number of jaws, but is is preferable to provide three. The three jaws 9, 9, 9 are separated by slots 10 which extend rearward but which terminate near the edge of the hub 11, this hub serving to connect all three of the jaws.

Threaded into an aperture in the hub 11 is a draw-back rod 12 for moving the hub and the jaws. The rod 12 is provided near its rear end with two oppositely positioned lugs 13, 13 which are engaged respectively by knuckle levers 14, 14. These levers 14, 14 are adapted to be engaged by a beveled surface formed on a slidable collar 15 which can be moved longitudinally by means of the hand lever 16. A spring 17 normally tends to move the rod and the jaws toward the right.

When the collar 15 is in its extreme left-hand position the levers 14, 14 are free to swing inward and the drack-back rod and the jaws are free to move toward the right. In this position the jaws are open and a work blank such as A can be inserted. When the lever 16 is swung to move the collar 15 toward the right, the levers 14, 14 are swung outward, thus engaging the lugs 13, 13 and drawing the rod 12 and the jaws toward the left. The jaws engage the beveled surface 8 and are thus forced radially inward toward each other and into firm engagement with the blank. The extent of movement of the jaws is limited by the work itself. Suitable means such as the pin 18 is provided for preventing relative rotative movement between the jaws and the chuck body. As illustrated, the pin is threaded into one of the jaws and extends through an aperture in the body.

Preferably the jaws do not engage directly with the work blank, but indirectly therewith through shoes 19, 19, 19 with which they are respectively provided. These shoes are preferable of cast iron or other soft metal so that they can be readily machined to form annular recesses such as indicated at 20. The shoes 19, 19, 19 are readily detachable, being held in place, for instance, by screws 21, and it will be understood that these shoes are provided in quantities so that a set of them can be properly turned to fit blanks of any desired diameter. It will be noted that the screws 21 are countersunk to such a depth that the recesses 20 can be cut back so that the blanks can lie over the heads of the screws without interference.

In accordance with my invention I do not rely upon the bottoms of the recesses 20, or in fact upon any part of the movable jaws, to determine the longitudinal position of the blank. I provide supplemental stops which are carried by the chuck body, and whose positions are therefore entirely independent of the adjustment of the jaws. So far as the broader features of my invention are concerned, the stops can be of any one of several constructions, but in the drawings I have shown a construction which I prefer as it has several important features of advantage. As shown, there are three stops which are positioned respectively in the slot between each two adjacent jaws. The three stops are represented in the drawings by 23, 23, 23.

Figure 2:
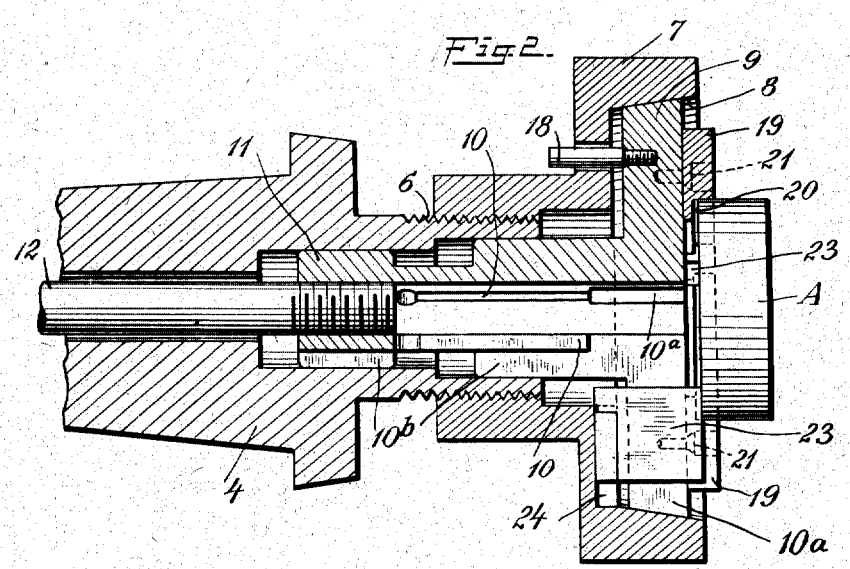
Fig. 2 is an enlarged sectional view showing the chuck.

As clearly appears in Fig. 2, the blank abuts against these stops to definitely determine its longitudinal position. There is no movement of the blank as the jaws move toward the left, the jaws simply sliding over the surface of the blank until such time as the pressure is sufficient to grip the blank and prevent further movement. Obviously, the extent of movement of the jaws toward the left will depend to some extent on the diameter of the blank and will be less for a blank a little over nominal diameter than for a blank a little under nominal diameter. There will also be variation in the extent of movement of the jaws depending upon the pressure which the operator applies. But this variation in the extent of movement of the jaws has no effect on the position of the blank, my improved chuck being in this respect different from and highly superior to other chucks as heretofore constructed.

It will be clear from the description which has been given that shoes 19 having differently diametered recesses may be provided so that the chuck may be adapted for holding blanks having a wide range of external diameters. In order that the stops 23 may be adapted for blanks having this wide range of diameter, it is preferable to make them radially adjustable. As shown in detail in Figs. 2 and 5, each stop 23 is mounted in a radial guideway 24 formed in the body of the chuck and is adjustable radially along this guideway. For clamping the stop in adjusted position there is provided a clamping block 25 adapted to be forced in place by means of a screw 26. Each slot 10 is widened as at 10$^a$ to accommodate the corresponding stop in any position. Preferably there is a groove 10$^b$ extending longitudinally of the jaws and of the hub 11 to permit the jaws and hub to be put in place or removed when the stops are at their innermost position of adjustment.

What I claim is:

1. In a draw-back collet chuck, the combination of a plurality of jaws movable longitudinally of the chuck body, means dependent on the longitudinal movement for moving the jaws radially inward, and three angularly spaced stop members carried directly by the body and serving to definitely position a work blank held by the jaws.

2. In a draw-back collet chuck, the combination of a body having a beveled surface, a plurality of jaws having beveled surfaces coöperating with that of the body, and three angularly spaced stop members carried directly by the body and serving to definitely position a work blank held by the jaws.

3. In a draw-back collet chuck, the combination of a body having a beveled surface, three jaws having beveled surfaces coöperating with that of the body, and three stop members carried directly by the body and located respectively in the spaces between the jaws, the stops serving to definitely position a work blank held by the jaws.

4. In a draw-back collet chuck, the combination of a plurality of jaws movably longitudinally of the chuck body, means dependent on the longitudinal movement for moving the jaws radially inward, and angularly spaced radially adjustable stop members carried by the body and serving to definitely position a work blank held by the jaws.

5. In a draw-back collet chuck, the combination of a body having a beveled surface, a plurality of jaws having beveled surfaces coöperating with that of the body, and angularly spaced radially adjustable stop members carried by the body and serving to definitely position a work blank held by the jaws.

6. In a draw-back collet chuck, the combination of a body having a beveled surface, a plurality of jaws having beveled surfaces coöperating with that of the body, and angularly spaced stop members carried directly by the body and radially adjustable respectively in the spaces between the jaws; the stops serving to definitely position a work blank held by the jaws.

7. In a draw-back collet chuck, the combination of a body having a beveled surface, a plurality of jaws having beveled surfaces coöperating with that of the body, detachable shoes carried respectively by the jaws and adapted to be machined to conform to a work blank of any desired diameter, and angularly spaced stop members carried directly by the body and serving to definitely position the blank engaged by the shoes.

8. In a draw-back collet chuck, the combination of a body having a beveled surface, a plurality of jaws having beveled surfaces coöperating with that of the body, detachable shoes carried respectively by the jaws and adapted to be machined to conform to a work blank of any desired diameter, and angularly spaced stop members carried directly by the body and radially adjustable in accordance with the diameter of the blank, the jaws serving to definitely position the blank engaged by the shoes.

In testimony whereof, I hereto affix my signature.

HOWARD C. WOGLOM.

Copies of this patent may be obtained for five cents each, by addressing the "Commissioner of Patents, Washington, D. C."